US011824364B2

(12) United States Patent
Kim et al.

(10) Patent No.: US 11,824,364 B2
(45) Date of Patent: Nov. 21, 2023

(54) ENERGY STORAGE SYSTEM

(71) Applicants: SUNGSILENERGY CO., LTD, Gwangju (KR); Sung Sil Kim, Gwangju (KR)

(72) Inventors: Sung Sil Kim, Gwangju (KR); Jung Uk Noh, Gwangju (KR)

(73) Assignees: SUNGSILENERGY CO., LTD, Gwangju (KR); Sung Sil Kim, Gwangju (KR)

( * ) Notice: Subject to any disclaimer, the term of this patent is extended or adjusted under 35 U.S.C. 154(b) by 114 days.

(21) Appl. No.: 17/764,963

(22) PCT Filed: Aug. 10, 2021

(86) PCT No.: PCT/KR2021/010554
§ 371 (c)(1),
(2) Date: Mar. 29, 2022

(87) PCT Pub. No.: WO2022/059918
PCT Pub. Date: Mar. 24, 2022

(65) Prior Publication Data
US 2022/0399720 A1 Dec. 15, 2022

(30) Foreign Application Priority Data
Sep. 17, 2020 (KR) .......................... 10-2020-0119759

(51) Int. Cl.
*H02J 3/32* (2006.01)
*H02J 7/00* (2006.01)
*H02M 1/00* (2006.01)

(52) U.S. Cl.
CPC ............ *H02J 3/32* (2013.01); *H02J 7/00714* (2020.01); *H02M 1/0009* (2021.05)

(58) Field of Classification Search
CPC ...... H02J 3/32; H02J 3/322; H02J 9/06; H02J 9/062; H02J 7/00714; H02M 1/0009
See application file for complete search history.

(56) References Cited

U.S. PATENT DOCUMENTS

2015/0375621 A1* 12/2015 Ono ........................ B60L 1/003
307/10.1
2021/0384729 A1* 12/2021 Thomas, III ........ H02J 7/00714

FOREIGN PATENT DOCUMENTS

| GB | 2287843 A | * | 9/1995 | ............... H02J 9/06 |
|---|---|---|---|---|
| KR | 10-2011-0084751 A | | 7/2011 | |
| KR | 10-1643705 B1 | | 7/2016 | |
| KR | 10-1616982 | | 8/2016 | |
| KR | 10-2017-046990 A | | 5/2017 | |
| KR | 10-2017-0127179 A | | 11/2017 | |
| KR | 10-2020-0089056 A | | 7/2020 | |

* cited by examiner

*Primary Examiner* — Ryan Johnson
(74) *Attorney, Agent, or Firm* — Maschoff Brennan

(57) ABSTRACT

An energy storage system comprises: an alternating-current/direct-current converter; a battery; a booster; a direct-current/alternating-current converter; a power control unit; an inductor having one terminal connected to a supply terminal to which normal alternating-current power is supplied; a switching unit having one terminal connected to the other terminal of the inductor and having the other terminal connected to an input/output terminal; a current determination unit which compares an inductor current flowing through the inductor with a power recovery limit current determined by a user; and a switching control unit.

2 Claims, 2 Drawing Sheets

ENERGY STORAGE SYSTEM

TECHNICAL FIELD

The present invention relates to an energy storage system, and more particularly to an energy storage system prevented from being damaged when commercial AC power, which is grid power supplied to the home, is restored after power outage, thereby being capable of continuously and stably supplying a load with the AC power of the system by the commercial AC power and the battery AC power generated by energy accumulated in a battery, the energy storage system enabling the commercial AC power to be supplied to an AC/DC converter for charging a battery through an input/output terminal and, at the same time, enabling the power charged in a battery to be supplied to the load though the input/output terminal. In addition, a power plug of the energy storage system is connected to an outlet which is a supply terminal to which the commercial AC power is supplied, so that the energy storage system can be easily installed without a work of installing a distribution box.

BACKGROUND ART

Energy Storage System (ESS), which is a type of battery that stores energy, is linked to a smart grid and stores power generated from renewable energy sources such as solar and wind power, or receives and stores power from external grid power during times when electricity rates are low and discharges the stored power during times when power consumption is high, thereby enabling power providers to increase the efficiency of power operation and to use low electricity rates.

In particular, due to the increased risk of cyclic blackout due to insufficient power which is the cause of a large-scale power outage due to excess power demand, demand for an energy storage system capable of storing idle power at light loads such as at night, and then using the stored power during peak loads, such as daytime, or power shortage to distribute the peak load through load leveling is increasing.

Even at home, such an energy storage system is used together with commercial AC power, which is grid AC power, in preparation for power shortage or power outage.

As an existing technology related to an energy storage system used at home, there is Korean Patent No. 10-1616982 "SMART ENERGY STORAGE SYSTEM" published on Apr. 29, 2016.

In the case of the existing smart energy storage system technology, power is stably supplied to load when grid power by commercial AC power is normally supplied or when commercial AC power is cut off due to power outage, but when commercial AC power is restored after power outage, signal synchronization between commercial AC power and AC power, which is generated by discharging energy stored in a battery, may be inconsistent, resulting in damage to the energy storage system.

In addition, in the case of the existing technology, an inlet of commercial AC power should be connected to an input of an AC/DC converter for charging a battery, and an output terminal of a DC/AC converter which converts the power charged in the battery into AC voltage should be connected to a load terminal, but the load terminal should be installed in a distribution box provided in the home. Accordingly, a work of installing a load terminal in a distribution box is required so as to mount an energy storage system on grid AC power, but it is not easy to perform the installation work.

DISCLOSURE

Technical Problem

Therefore, the present invention has been made in view of the above problems, and it is one object of the present invention to provide an energy storage system prevented from being damaged when commercial AC power, which is grid power supplied to the home, is restored after power outage, thereby being capable of continuously and stably supplying a load with the AC power of the system by the commercial AC power and the battery AC power generated by energy accumulated in a battery, the energy storage system enabling the commercial AC power to be supplied to an AC/DC converter for charging a battery through an input/output terminal and, at the same time, enabling the power charged in a battery to be supplied to the load though the input/output terminal. In addition, a power plug of the energy storage system is connected to an outlet which is a supply terminal to which the commercial AC power is supplied, so that the energy storage system can be easily installed without a work of installing a distribution box.

Technical Solution

In accordance with an aspect of the present invention, the above and other objects can be accomplished by the provision of an energy storage system, including an AC/DC converter configured to receive commercial AC power, which is grid power, through an input/output terminal and convert the commercial AC power into DC power; a battery for charging DC power that is output from the AC/DC converter; a booster configured to boost the DC power charged in the battery and output a boost DC voltage; a DC/AC converter configured to convert the boost DC voltage into AC power and supply battery AC power to a load through the input/output terminal; a power controller configured to control driving of the AC/DC converter such that the battery is charged and control driving of the DC/AC converter such that the battery AC power is supplied to the load; an inductor whose one terminal is connected to a supply terminal to which the commercial AC power is supplied; a switching part whose one terminal is connected to another terminal of the inductor and whose another terminal is connected to the input/output terminal; a current determination part configured to compare an inductor current flowing through the inductor with a power recovery limiting current defined by a user; and a switching controller configured to output an activated switching control signal to turn on the switching part when the inductor current is smaller than the power recovery limiting current in the current determination part, output an inactive switching control signal to turn off the switching part when the inductor current is the same as the power recovery limiting current, and activate the switching control signal to turn on the switching part when a reference time defined by a user elapses after inactivation of the switching control signal.

Advantageous Effects

As apparent from the above description, the present invention provides an energy storage system prevented from being damaged when commercial AC power, which is grid power supplied to the home, is restored after power outage, thereby being capable of continuously and stably supplying a load with the AC power of the system by the commercial AC power and the battery AC power generated by energy accumulated in a battery, the energy storage system enabling the commercial AC power to be supplied to an AC/DC converter for charging a battery through an input/output terminal and, at the same time, enabling the power charged in a battery to be supplied to the load though the input/output terminal. In addition, a power plug of the energy storage system is connected to an outlet which is a supply terminal to which the commercial AC power is supplied, so that the energy storage system can be easily installed without a work of installing a distribution box.

BEST MODE

Now, an energy storage system of the present invention is described in detail with reference to the accompanying drawings.

Figure 1:
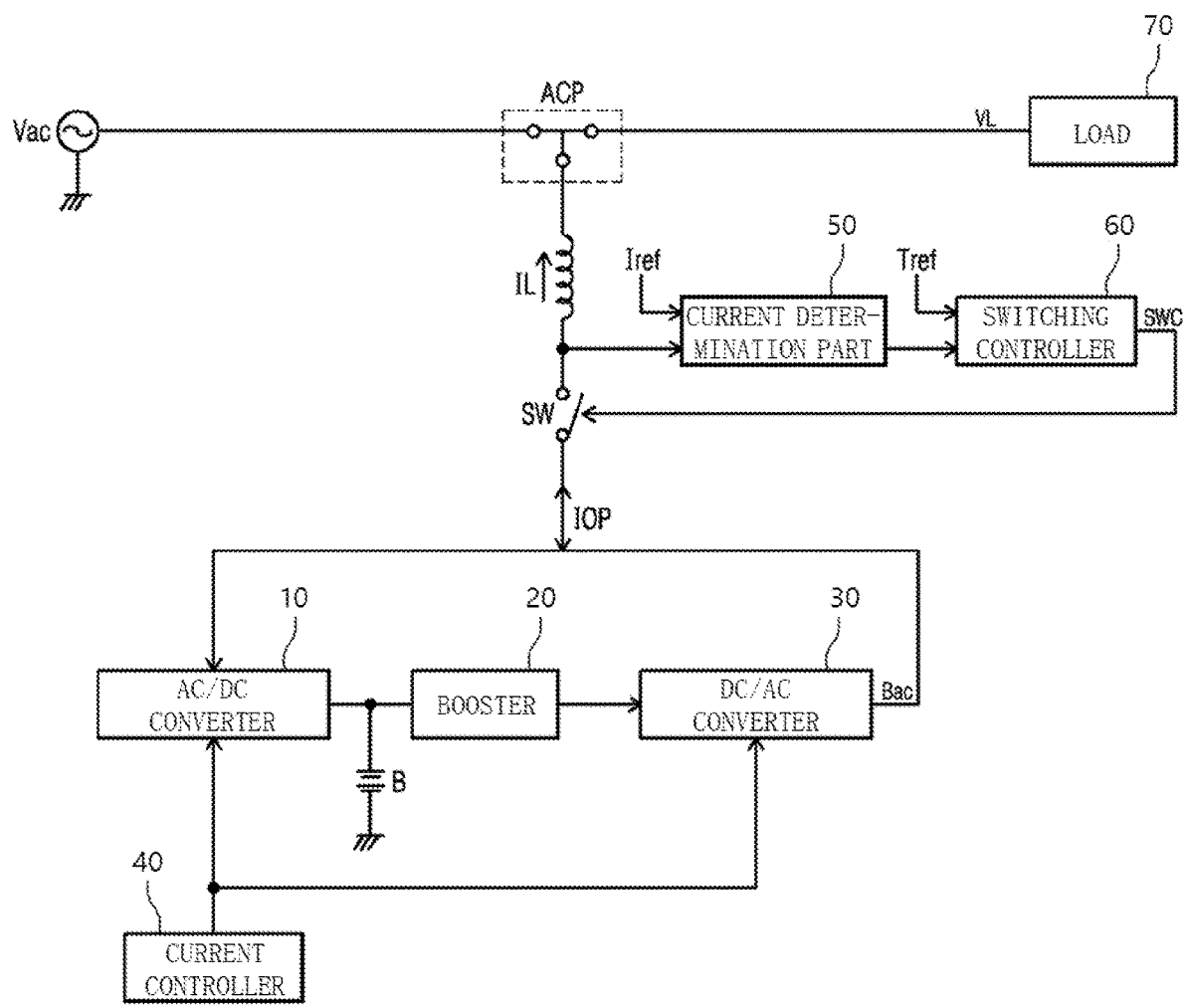
FIG. 1 illustrates a block diagram of an energy storage system of the present invention.

As shown in FIG. 1, the energy storage system of the present invention includes an AC/DC converter 10 configured to receive commercial AC power Vac, which is grid power, through an input/output terminal IOP and convert the commercial AC power into DC power, a battery B for charging DC power that is output from the AC/DC converter 10, a booster 20 configured to boost the DC power charged in the battery B and output a boost DC voltage DC, a DC/AC converter 30 configured to convert the boost DC voltage DC into AC power and supply battery AC power Bac to a load 70 through the input/output terminal IOP, a power controller 40 configured to control driving of the AC/DC converter 10 such that the battery B is charged and control driving of the DC/AC converter 30 such that the battery AC power Bac is supplied to the load 70, an inductor L whose one terminal is connected to a supply terminal ACP to which the commercial AC power Vac is supplied, a switching part SW whose one terminal is connected to another terminal of the inductor L and whose another terminal is connected to the input/output terminal IOP, a current determination part 50 configured to compare an inductor current IL flowing through the inductor L with a power recovery limiting current Iref defined by a user, and a switching controller 60 configured to output an activated switching control signal SWC from the current determination part 50 to turn on the switching part SW when the inductor current IL is smaller than the power recovery limiting current Iref, output an inactive switching control signal SWC to turn off the switching part SW when the inductor current IL is the same as the power recovery limiting current Iref, and activate the switching control signal SWC to turn on the switching part SW when a reference time Tref defined by a user elapses after inactivation of the switching control signal SWC.

In addition, the supply terminal ACP to which the commercial AC power Vac is supplied is connected to an outlet and a power plug is connected to one terminal of the inductor L so that the power plug is connected to the outlet.

The energy storage system of the present invention having the constitution operates as follows.

As shown in FIG. 1, the AC/DC converter 10, the battery B, the booster 20, the DC/AC converter 30, and the power controller 40 of the present invention are general components of an energy storage system.

The AC/DC converter 10 receives the commercial AC power Vac from the supply terminal ACP to which the commercial AC power Vac, which is grid power, is supplied through the input/output terminal IOP, and converts the commercial AC power Vac into DC power corresponding to charging voltage of the battery B, and the battery B is charged with the DC power.

The booster 20 boosts the DC power charged in the battery B to a DC voltage of about 400 V and outputs the boost DC voltage DC.

The DC/AC converter 30 converts the boost DC voltage DC into AC power and supplies the battery AC power Bac to the load 70 through the input/output terminal IOP.

The power controller 40 controls driving of the AC/DC converter 10 such that the battery B is in a set charged state, and controls driving of the DC/AC converter 30 such that the battery AC power Bac is supplied to the load 70 when the condition of discharging energy accumulated in the battery B is reached.

Discharge conditions may be set in various ways, such as during a power outage or in a daytime zone set to be usable for peak loads during the day.

When the commercial AC power Vac, which is grid power, is normally supplied, the load 70 is driven by the commercial AC power Vac or, in a discharge condition, the load 70 is driven by the commercial AC power Vac and the battery AC power Bac.

When power outage occurs while the commercial AC power Vac is normally supplied, the load 70 is only driven by the battery AC power Bac.

A maximum current supplied to a load when the commercial AC power Vac is normally supplied or power outage occurs is a necessary power/220 V required by the load. Accordingly, assuming that a necessary power required by general load at home does not exceed the maximum 7 KW, a maximum current is 7 KW/220V=32 A.

Figure 2:
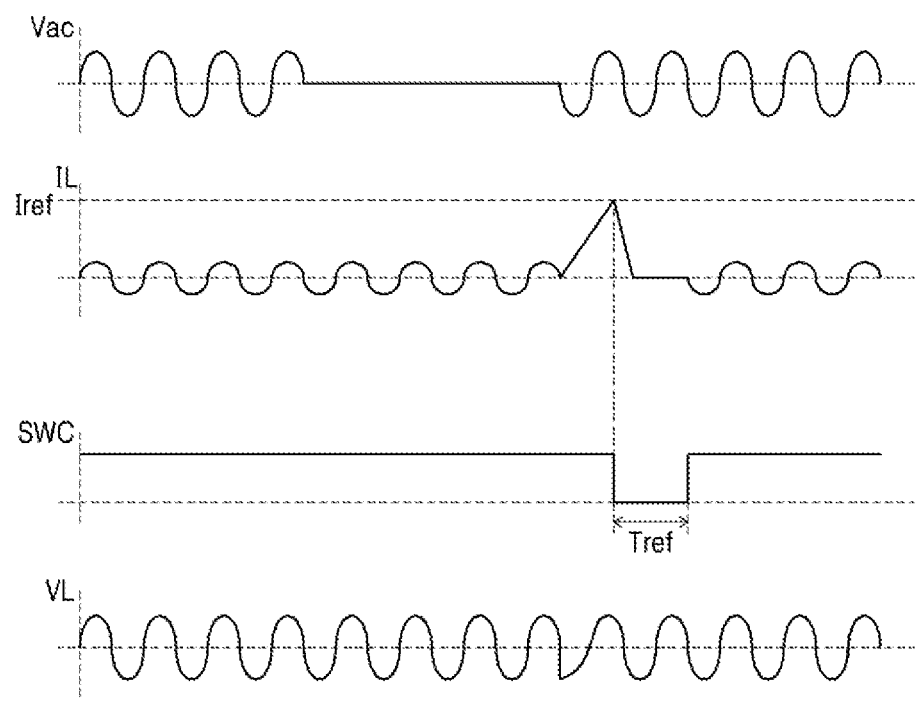
FIG. 2 illustrates waveform diagrams of a commercial AC power inductor current, switching control signal, and load supply power for explaining the operation of an energy storage system of the present invention.

As shown in FIG. 2, if the power recovery limiting current (Iref) defined by a user is set to 40 A that is a value greater than the maximum current supplied to the load, the inductor current IL flowing through the inductor L and the power recovery limiting current Iref are compared with each other by the current determination part 50 when commercial AC power supply ac is normally supplied or power outage occurs. Here, since the inductor current IL always has a value smaller than the power recovery limiting current Iref, the switching controller 60 outputs an activated switching control signal SWC and the switching part SW is turned on by the activated switching control signal SWC.

Accordingly, since the switching part SW is continuously in an on state when the commercial AC power ac is normally supplied or power outage occurs, the load 70 is driven by the commercial AC power Vac when the commercial AC power ac is normally supplied, or in a discharge condition, the load 70 is driven by the commercial AC power Vac and the battery AC power Bac, or during power outage, the battery AC power Bac is supplied to the load 70 through the input/output terminal IOP so that the load 70 is driven.

When the commercial AC power Vac is restored after power outage, the battery AC power Bac is also supplied to the supply terminal ACP through the input/output terminal IOP, the inductor current IL increases by the inductor L when a phase difference between the commercial AC power Vac and the battery AC power Bac during power recovery is 180 degrees as shown in FIG. 3, i.e., when AC power of the battery AC power Bac is +220 V and the commercial AC power Vac is −220 V, the switching controller 60 outputs an inactivated switching control signal SWC when the inductor current IL increases by the current determination part 50 to the same value as the power recovery limiting current Iref, and the switching part SW is turned off by the inactive switching control signal SWC so that the inductor current IL becomes 0.

Accordingly, when the inductor current IL becomes the same value as the power recovery limiting current Iref as the inductor current IL slowly increases by the inductor L during power recovery, the switching part SW is turned off, and the battery AC power Bac is not output to the supply terminal ACP due to the OFF of the switching part SW, so that the commercial AC power Vac is only supplied to the load 70.

Accordingly, damage to an energy storage system caused by a phase difference between the commercial AC power Vac and the battery AC power Bac during power recovery may be prevented, and the load 70 may be normally driven by the commercial AC power Vac.

When the reference time Tref, approximately 3 seconds, determined by a user elapses after the switching control signal SWC is inactivated by power recovery, the switching control unit 60 outputs an activated switching control signal SWC so that the switching unit SW is turned on and the energy storage system normally operates.

Accordingly, the present invention may continuously and stably supply the AC power of the system by the commercial AC power; and the battery AC power, which is generated by the energy accumulated in the battery, to the load 70 even when power is restored.

In addition, by the energy storage system of the present invention, the commercial AC power Vac is supplied to the AC/DC converter 10 for charging a battery through the input/output terminal IOP and, at the same time, the battery AC power Bac charged in the battery B is supplied to the load through the input/output terminal IOP. In addition, the supply terminal ACP to which the commercial AC power Vac is supplied is connected through the outlet, and the power plug of the energy storage system is connected to the outlet so that the supply terminal ACP and the inductor L are connected to each other through the power plug. Accordingly, the energy storage system can be conveniently installed without a work of installing a distribution box as in the conventional cases.

DESCRIPTION OF SYMBOLS

10: AC/DC converter
20: booster
30: DC/AC converter
40: power controller
50: current determination part
60: switching controller

The invention claimed is:

1. An energy storage system, comprising:
an AC/DC converter configured to receive commercial AC power, which is grid power, through an input/output terminal and convert the commercial AC power into DC power;
a battery for charging DC power that is output from the AC/DC converter;
a booster configured to boost the DC power charged in the battery and output a boost DC voltage (DC);
a DC/AC converter configured to convert the boost DC voltage into AC power and supply battery AC power to a load through the input/output terminal;
a power controller configured to control driving of the AC/DC converter such that the battery is charged and control driving of the DC/AC converter such that the battery AC power is supplied to the load;
an inductor whose one terminal is connected to a supply terminal to which the commercial AC power is supplied;
a switching part whose one terminal is connected to another terminal of the inductor and whose another terminal is connected to the input/output terminal;
a current determination part configured to compare an inductor current flowing through the inductor with a power recovery limiting current defined by a user; and
a switching controller configured to output an activated switching control signal to turn on the switching part when the inductor current is smaller than the power recovery limiting current in the current determination part, output an inactive switching control signal to turn off the switching part when the inductor current is the same as the power recovery limiting current, and activate the switching control signal to turn on the switching part when a reference time defined by a user elapses after inactivation of the switching control signal.

2. The energy storage system according to claim 1, wherein the supply terminal to which the commercial AC power is supplied is connected to an outlet and a power plug is connected to one terminal of the inductor so that the power plug is connected to the outlet.

* * * * *